(12) United States Patent
Ghassemi (10) Patent No.: US 7,589,428 B2
(45) Date of Patent: Sep. 15, 2009

(54) ELECTRO GRAVITY PLATES FOR GENERATING ELECTRICITY FROM PASSAGE OF VEHICLES OVER THE PLATES

(76) Inventor: Faramarz Frank Ghassemi, 23942 Craftsman Rd., Calabasas, CA (US) 91302-1437

(*) Notice: Subject to any disclaimer, the term of this patent is extended or adjusted under 35 U.S.C. 154(b) by 18 days.

(21) Appl. No.: 12/049,174

(22) Filed: Mar. 14, 2008

(65) Prior Publication Data

US 2009/0058099 A1 Mar. 5, 2009

Related U.S. Application Data

(60) Provisional application No. 60/914,103, filed on Apr. 26, 2007, provisional application No. 60/911,316, filed on Apr. 12, 2007.

(51) Int. Cl.
*F02B 63/04* (2006.01)
(52) U.S. Cl. ............... 290/1 R; 290/1 A; 290/1 C; 290/1 E
(58) Field of Classification Search ............. 290/1 R, 290/1 C, 1 A, 1 E
See application file for complete search history.

(56) References Cited

U.S. PATENT DOCUMENTS 7,239,031 B2 * 7/2007 Ricketts .............. 290/1 R
7,489,045 B1 * 2/2009 Bradford et al. ....... 290/1 R

* cited by examiner

*Primary Examiner*—Nicholas Ponomarenko
*Assistant Examiner*—Iraj A Mohandesi
(74) *Attorney, Agent, or Firm*—Randick O'Dea & Tooliato LLP; Paul Martin, Esq.; John Nielsen, Esq.

(57) ABSTRACT

Electro-gravity plates are applied to road surfaces for generating electricity from the passage of vehicles over the plates. Each plate contains a packed lattice of electro-gravity cells that individually produces electricity from the passing vehicles. The cells use a variety of technologies to convert the kinetic energy and the gravitational potential energy of moving vehicles into electricity. A first type of cell includes a spring-loaded permanent magnet inside a solenoid. The passing vehicles cause the magnet to translate up and down inside the solenoid for generating electricity. A second type of cell includes a spring-loaded hammer and a piezoelectric material. The passing vehicles cause the hammer to compress the piezoelectric material for generating electricity. A third type of cell includes a counterweighted crank rotatably coupled to a dynamo. The passing vehicles cause the crank to rotate the dynamo for generating electricity.

34 Claims, 8 Drawing Sheets

$E = mgh + 1/2\, mv^2$

ELECTRO GRAVITY PLATES FOR GENERATING ELECTRICITY FROM PASSAGE OF VEHICLES OVER THE PLATES

CROSS REFERENCE TO RELATED APPLICATIONS

This application claims the benefit of U.S. Provisional Application No. 60/911,316, filed Apr. 12, 2007, and U.S. Provisional Application No. 60/914,103, filed Apr. 26, 2007, which are incorporated herein by reference.

FIELD OF INVENTION

This invention relates in general to mechano-electrical energy generation systems, and is particularly related to method and apparatus that convert kinetic energy and gravitational potential energy of moving vehicles on the roads into electricity.

DESCRIPTION OF RELATED ART

The demand for electrical energy is rapidly and ever increasing. At present, almost 90% of the electrical power is generated by burning fossil fuels, which all contribute to green house emissions. In addition to environmental concerns, fossil fuels will eventually be depleted. While renewable sources of energy such as solar and wind help to alleviate these problems, they have proven to be expensive and slow to develop. Hydroelectric power plants are limited because almost all the rivers that could be dammed have been explored and utilized. Thus, the need for a totally new and renewable source of energy is very obvious.

U.S. Pat. No. 7,067,932 ("'932 patent") discloses an invention that utilizes an untapped and vast energy source that can potentially produce hundreds of millions of kilowatts of electricity each year from the momentum and the mass of moving cars over a special speed bump like ramp. At present, a workable prototype of the ramp is available that produces up to 3 watts of energy from the passage of a car over the ramp. The ramp has a height of 10 to 20 cm, which is useful where cars and trucks are forced to slow down or come to a complete stop. The ramp can replace the speed bumps in shopping malls, truck stops, bridge tolls, highway tolls, and parking lots.

Figure 1:
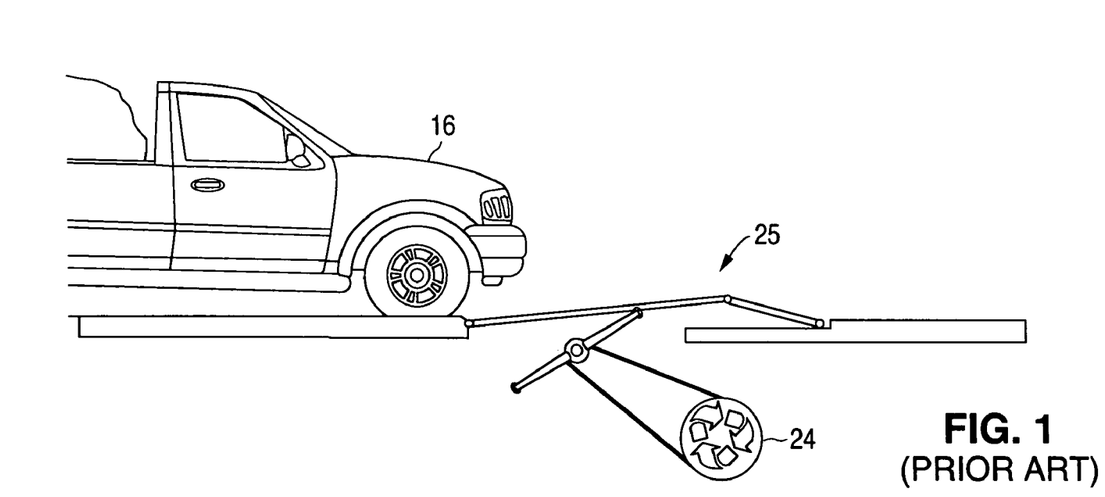
FIGS. 1 and 2 diagrammatically illustrate a ramp for generating electricity from the passage of vehicles over the ramp.
Figure 2:
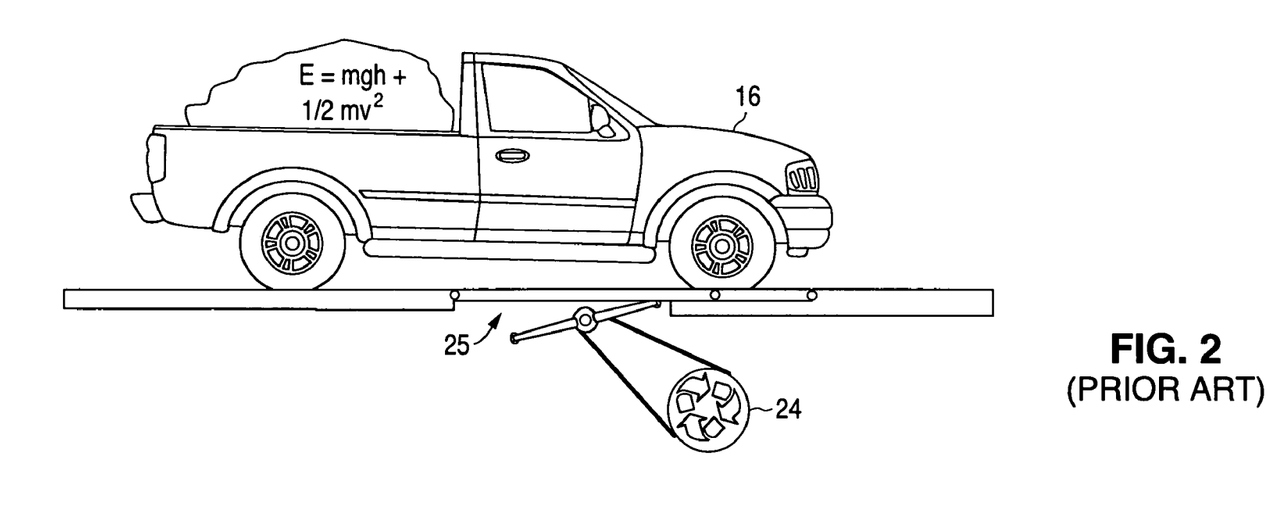

FIG. 1 shows a ramp 25 of the '932 patent in a reset and "up" position. FIG. 2 shows a truck 16 moving over ramp 25, causing it to flatten in a "down" position. This up/down movement of ramp 25 causes a generator 24 to rotate and generate electricity. A large shopping mall with 10,000 car traffic a day and 50 such speed bumps can generate 500,000 to one million watts of electricity each day, which can supply electricity to many stores or residential homes. Clearly ramp 25 can generate a large amount of electrical power under the right conditions.

Due to the speed limitation on cars and the physical size of ramp 25, its applications are limited to situations where vehicles are required to slow down or stop before or after the ramp.

SUMMARY

In accordance with the present invention, advantage is taken of the kinetic energy and the gravitational potential energy of moving vehicles for generating electricity. More particularly, the present invention is directed to electro-gravity plates (EGPs) for generating electricity from the passage of vehicles over the plates. The EGPS are applied to road surfaces, especially those on declining slopes, to create a renewable and growing source of energy. As transmission lines are often located next to roads, the EGPS can easily be tied into the existing infrastructure for delivering electrical power to the grid.

Each electro-gravity plate (EGP) contains a packed lattice of electro-gravity cells (EGCs) that individually produces electricity from the passage of vehicles over the plate. The EGCs can use a variety of technologies to convert the kinetic energy and the gravitational potential energy of moving vehicles into electricity. A first embodiment of the electro-gravity cell (EGC) includes a spring-loaded permanent magnet inside a solenoid. The passage of vehicles causes the magnet to translate up and down inside the solenoid for generating electricity. A second embodiment of the EGC includes a spring-loaded hammer and a piezoelectric material. The passage of vehicles causes the hammer to compress the piezoelectric material for generating electricity. A third embodiment of the EGC includes a counterweighted crank rotatably coupled to a dynamo. The passage of vehicles causes the crank to rotate the dynamo for generating electricity.

BRIEF DESCRIPTION OF THE DRAWINGS

Use of the same reference numbers in different figures indicates similar or identical elements.

DETAILED DESCRIPTION OF THE INVENTION

In accordance with embodiments of the invention, an electro-gravity plate (EGP) contains a packed lattice of electro-gravity cells (EGCs) that individually produces electricity from the passage of vehicles over the cells. The EGCs create small bumps in the road that do not significantly limit the speed of vehicles traveling over the cells. This is especially true when the EGCs and the electro-gravity plates (EGPs) are applied to roads having declining slopes. Covering the surfaces of highways, bridges, and roads in the industrialized countries with EGPs creates a significant, renewable, and growing reserve of energy. As transmission lines are often located next to roads, the EGPS can easily be tied into the existing infrastructure for delivering electrical power to the grid.

Electro-Gravity Plate

Figure 3:
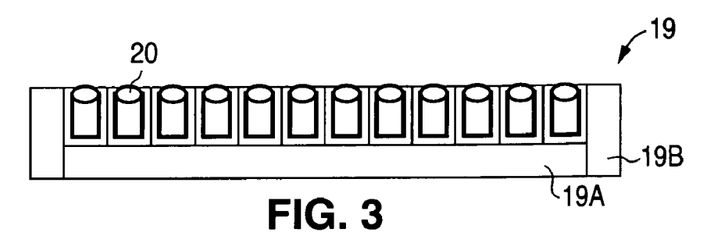
FIGS. 3 and 4 are diagrammatic side and top plan views, respectively, of an electro-gravity plate in one embodiment of the invention.
Figure 4:
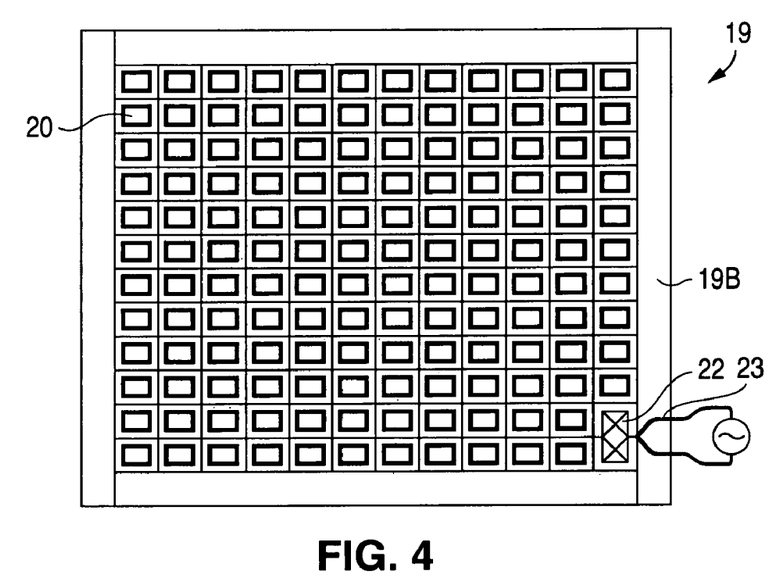

Attention is initially directed to FIGS. 3 and 4, which illustrate an embodiment of an EGP 19 in accordance with the present invention. EGP 19 has a rugged casing with a base 19A and a vertical body 19B around the perimeter of the base. The casing contains a lattice array of EGCs 20 (only one is labeled for clarity).

EGP 19 is typically square in shape and has the size of the average footprint of a passenger car tire, which is about 20 by 20 cm. As a nominal example, a 20 by 20 cm EGP 19 can contain 400 1 by 1 cm EGCs 20. However, the dimensions of the EGP and the EGC can vary based on the application and ease of manufacturing. For example, a single large EGP 19 can be used instead of multiple smaller EGPs. Each electro-gravity cell (EGC) 20 is capable of creating electricity by various mechanisms, three of which are described later in reference to the figures.

EGP 19 is typically enclosed, hermetically sealed, and made rugged to withstand severe weather conditions and millions of passing vehicles (e.g., cars, trucks, and trains) of different masses at different speeds. The term "plate" is used to emphasize the rugged construction of EGP 19. The term "rugged" is used to emphasize the durability of EGP 19. EGP 19 may include a top cover plate contacting the top surface of EGCs 20. As an alternative, EGP 19 can be hermetically sealed with an encapsulant that encapsulates EGCs 20 within the plate and forms a top cover.

Referring to FIG. 4, EGP 19 includes electronics circuits in an electronics block 22. Electronics block 22 provides the collection, transformation, integration, storage, regulation, and proper adjustment of the electrical power generated by EGCs 20. Electronics block 22 provides a useful electrical output to an outlet 23. The electrical output can be alternating current (AC) that goes directly to a utility grid, direct current (DC) that charges batteries, or both. Multiple EGPs 19 can also be electrically coupled in series or in parallel through outlets 23 to provide a single source of output. The design of electronics block 22 and the coupling of EGPs 19 through outlets 23 are not detailed as they use conventional technologies found in the computer chip industry, rechargeable electronics devices, electromechanical flashlights, radios, and solar panels.

Figure 5:
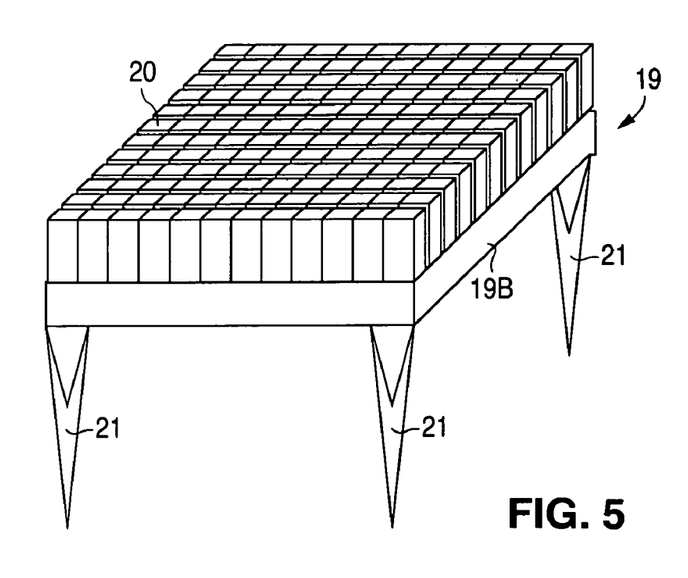
FIG. 5 is a diagrammatic perspective view of the electro-gravity plate of FIGS. 3 and 4 in one embodiment of the invention.
Figure 6:
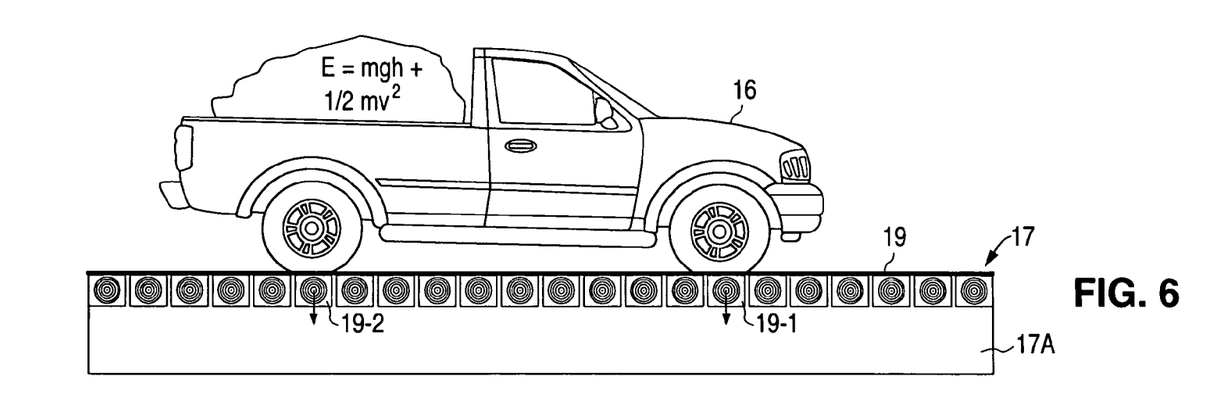
FIG. 6 diagrammatically illustrates a vehicle passing over a road surface tiled with electro-gravity plates in one embodiment of the invention.

FIG. 5 illustrates anchors 21 that extend from the bottom of base 19A in one embodiment of the invention. For clarity, body 19B is not shown. Anchors 21 penetrate into a road base 17A (FIG. 6) to secure EGP 19 to a road 17 (FIG. 6). The anchor design is not detailed as it uses conventional technologies found in cement, dirt, and asphalt anchors on the market. The design of anchors 21 should allow for easily repair and replacement of EGPs 19. Presently, "cat's eyes" and other raised pavement markers on the roads use such a design. Alternatively, EGPs 19 can be fixed by glue to the road surface.

FIG. 6 illustrates road 17 with road base 17A tiled with EGPs 19 (only one is labeled for clarity) in one embodiment of the invention. EGPs 19 may be electrically coupled through their outlets 23 (FIG. 4) to provide a single source of output. As truck 16 moves on the tiled surface of road 17, its kinetic energy and gravitational potential energy cause truck 16 to depress EGPs 19 and activate the individual EGCs 20 (FIGS. 3 to 5) to generate electricity. For example, the front and rear tires of truck 16 assert downward forces on EGPs 19-1 and 19-2.

Three embodiments of EGCs are described hereafter.

Vertical Electromechanical Gravity Cell

The limitations of the ramp assembly of the '932 patent were described above in paragraph [0006]. To apply such a technology to EGCs in an EGP, the design of the ramp assembly must be miniaturized. While technology can indeed miniaturize the exact design of the ramp assembly, there would be too many moving parts so that cost and durability, as well as manufacturability, will be challenging. Thus, a new and different design for an electromechanical gravity cell with minimum moving parts is needed.

Figure 7:
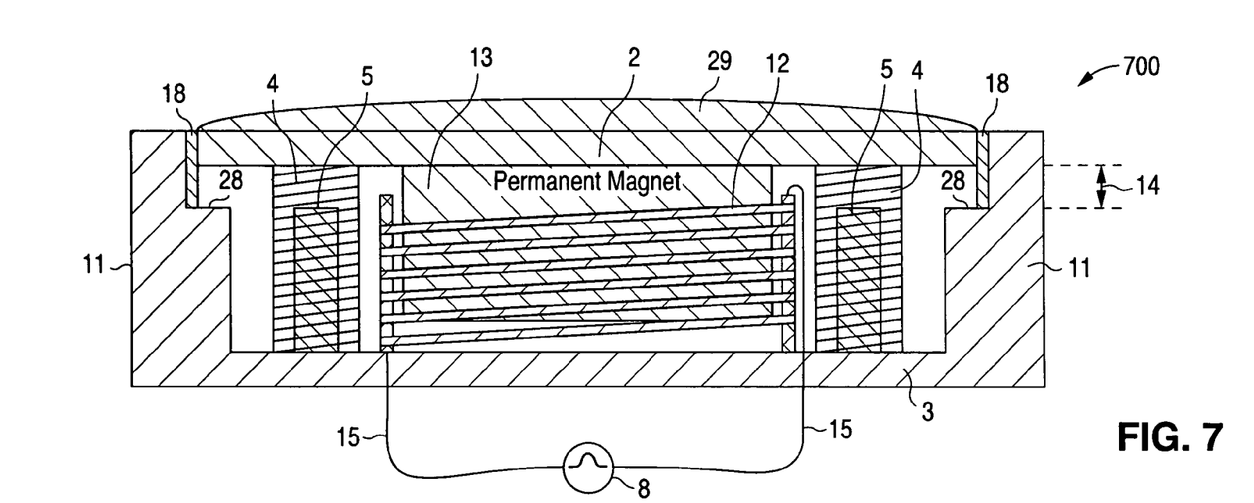
FIGS. 7 and 8 are diagrammatic side views of an electromagnetic gravity cell in a rest and up position and a down position, respectively, in one embodiment of the invention.

FIG. 7 illustrates one embodiment of an electro-gravity cell 700 that utilizes a moving permanent magnet inside a solenoid to create a vertical electrical generator in accordance with the invention. Passing vehicle over the cell moves the magnet up and down inside the solenoid to generate electrical power. This cell is hereafter referred to as a vertical electromechanical gravity (VEMG) cell 700.

VEMG cell 700 includes a rugged casing with a base 3 and a vertical body 11 around the perimeter of the base. The casing is typically square but can be rectangular, round, or any other geometrical shape that allows cells to be easily packed into an EGP. As a nominal example, the casing is 1 by 1 cm square. However, the dimensions of the EGC can vary based on the application and ease of manufacturing. Base 3 and body 11 are typically cast or machined from the same material.

Body 11 has a rest step 28 that forms a counterbore opening above a main opening to base 3. A ramp body 2 is seated in the counterbore opening and step 28 limits the downward travel of ramp body 2. A permanent magnet 13 is secured to the bottom of ramp body 2 and suspended inside a solenoid 12 secured to base 3. Alternatively, magnet 13 is secured to base 3 and solenoid 12 is secured to the bottom of ramp body 2.

A friction-reducing layer 18 is applied to the sidewall of the counterbore opening to ensure ramp body 2 travels up and down in a smooth and controlled fashion. Layer 18 can be made of an alloy or a syntactic material that reduces friction and substantially seals the cell from entry of unwanted particles.

A spring-loaded mechanism returns ramp body 2 from a down position within the counterbore hole to a reset and up position. It should be emphasized that the spring-loaded mechanism is not limited to the use of metal coil springs but refers to any mechanism that can return ramp body 2 from the down position to the reset and up position. Furthermore, the spring-loaded mechanism can serve to control the height of the reset and up position of ramp body 2, and couple ramp body 2 and base 3 to prevent them from becoming detached.

One embodiment of the spring-loaded mechanism includes one or more springs 4 and corresponding spring supports 5 in accordance with the invention. Spring supports 5 are secured to base 3 or alternatively to ramp body 2. Spring supports 5 are of the same height as step 28. Therefore, ramp body 2 rests on step 28 as well as spring supports 5 when it is fully seated in the counterbore opening. Spring supports 5 can be cast or machined from the same material as base 3 and body 11. Springs 4 fit around spring supports 5 and are permanently secured to the bottom of ramp body 2 and the top of base 3.

An impact gap 14 is illustrated to indicate the allowance for the downward movement of ramp body 2. Impact gap 14 is the vertical distance between the bottom of ramp body 2 at the up position and step 28. The height of impact gap 14 is designed to balance between the efficient generation of power and the durability of the cell from repeated use.

The kinetic energy of a moving car is $\frac{1}{2} mv^2$, and the gravitational potential energy of the moving car is mgh, where "m" is the mass of the vehicle, "v" is the velocity of the vehicle, "g" is the gravitational constant, and "h" is an arbitrary height of the vehicle above a reference point. In VEMG cell 700, arbitrary height h corresponds to the height of impact gap 14 that determines how far a vehicle drops.

As will be appreciated from the above formulae, a faster and more massive vehicle generates more power, and a greater drop generates more power. However, too great of a fall is not practical as it will impede vehicle movement. As a nominal example, impact gap 14 has a height of 2 mm in one embodiment of the invention. However, the height of impact gap 14 can vary based on the application. Since the vehicle moves over ramp body 2 and pushes the ramp body down, the resistance felt by the vehicle over a 2 mm bump is not significant.

Ramp body 2 includes a bump 29 with a convex top surface that protrudes above body 11 when the ramp body is fully extended in the reset and up position. In one embodiment, the height of bump 29 is substantially the same as the height of impact gap 14. Therefore, when a vehicle moves over VEMG cell 700, it travels over a collapsible bump of 2 mm. When ramp body 2 is fully retracted in the down position, the tire of the vehicle rolls over a substantially flat road surface and moves over the cell with little resistance. This ensures a smooth vehicle movement over the cell as well as the durability of the cell. The average roughness of an asphalt or concert road is on the same order of magnitude as 1 to 2 mm. Vehicles can move at high speeds over such VEMG cells as they go over cat's eyes and other raised pavement markers that are sometimes more than 5 mm high without reducing speed. It should be emphasized that any resistance provided by VEMG cell 700 may help to provide a desirable drag to save vehicles from applying their breaks and using engine braking in certain applications, such as on roads downhill. Furthermore, any resistance provided by VEMG cell 700 may help to provide additional traction to the vehicle in certain applications, such as on roads in areas with abundant rain and snow.

Figure 8:
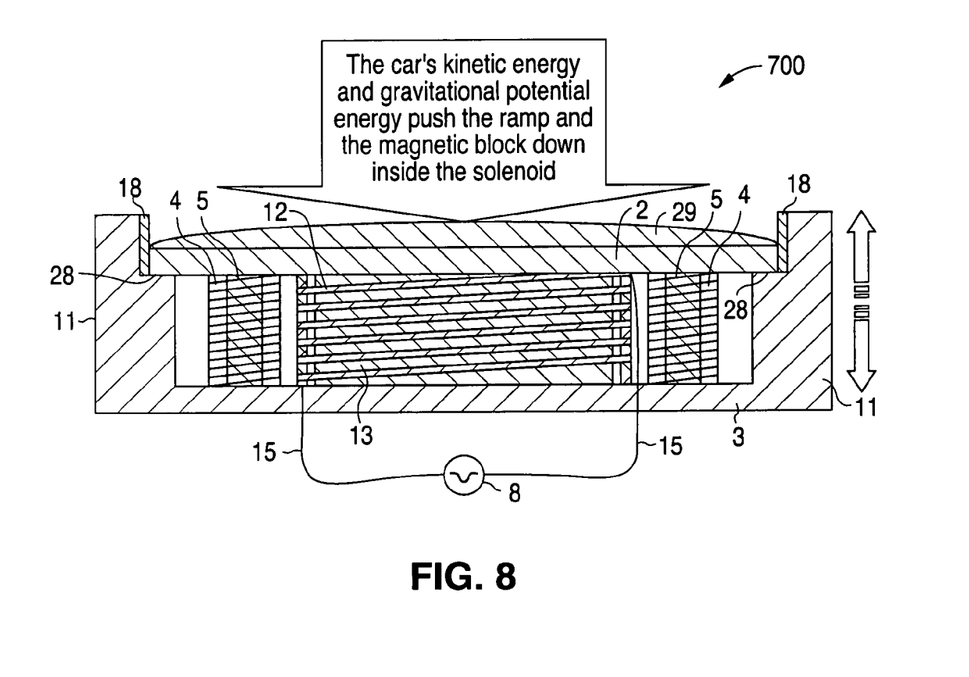

FIG. 7 illustrates VEMG cell 700 in the reset and up position. Springs 4 are extended to push ramp body 2 and magnet 13 to their highest position. FIG. 8 illustrates VEMG cell 700 in the down position when a vehicle is passing over the cell in one embodiment of the invention. In this case, ramp body 2 and magnet 13 are pushed down until they rest on step 28 and spring supports 5. As a result of this movement, the magnetic field of magnet 13 crosses the wires of solenoid 12 and generates electricity in the wires. For illustrative purposes, a voltmeter 8 is shown connected by wires 15 to solenoid 12 to show the generation of electrical power.

After the vehicle passes over VEMG cell 700, springs 4 returns ramp body 2 and magnet 13 back to the reset and up position as shown in FIG. 7. It should be noted that this reverse action also generates electrical power as the magnetic field of magnet 13 again crosses the wires of solenoid 12.

Piezoelectric Gravity Cell

Figure 9:
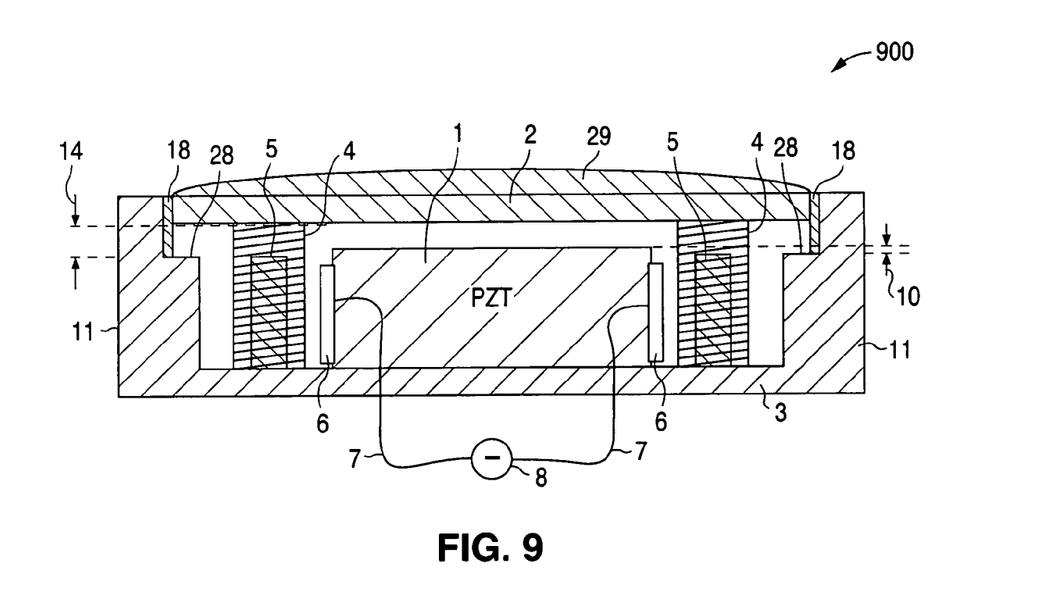
FIGS. 9 and 10 are diagrammatic side views of a piezoelectric gravity cell in a reset and up position and a down position, respectively, in one embodiment of the invention.

FIG. 9 illustrates one embodiment of an electro-gravity cell 900 that replaces solenoid 12 and permanent magnet 13 of VEMG cell 700 with a piezoelectric material in accordance with the invention. The piezoelectric material generates electric power from the pressure and impact of a moving vehicle over the cell. This cell is hereafter referred to as a piezoelectric-gravity (PZG) cell 900. It should be noted that the term piezoelectric is used as a generic term and is not limited to any specific material, whether synthetically manufactured or naturally occurring.

In PZG cell 900, magnet 13 and solenoid 12 of the VEMG cell 700 are replaced by a piezoelectric material (PZT) 1. PZT 1 is detached from ramp body 2 (also referred to as a "hammer") but secured to the top base 3. Alternatively, PZT 1 is secured to the bottom of hammer 2 and detached from the top of base 3. Electrodes 6 are permanently attached to the proper sides of PZT 1 to collect electricity. There are different techniques used for attaching electrodes 6 to PZT 1. For example, electrodes 6 may be glued or vapor deposited on PZT 1.

As seen in FIG. 9, before a vehicle passes over PZG cell 900, PZT 1 is not under stress and does not generate any electricity. For illustrative purposes, voltage meter 8 is connected by wires 7 to electrodes 6 on PZT 1 to show no electricity is generated.

In the reset and up position, springs 4 support the weight of hammer 2 at the desired maximum height so that bump 29 protrudes above body 11. Impact gap 14 (e.g., 2 mm) indicates the maximum downward movement of hammer 2. Impact gap 14 is the vertical distance between rest step 28 and the bottom of hammer 2 when the ramp body is in the reset and up position.

A gap 10 protects PZT 1 from excessive pressure that can damage the PZT. Gap 10 is the vertical distance between rest step 28 and the top of PZT 1 when the PZT is uncompressed. When hammer 2 hits PZT 1 and rests on it, the PZT may be compressed by the pressure. Therefore, gap 10 limits the amount that PZT 1 can be compressed. Note that gap 10 may be extremely small or negligible. The height of gap 10 and impact gap 14 are designed to balance between the efficient generation of power and the durability of the cell from repeated use.

The construction of PZG cell 900 may use a combination of different materials. Depending on the conductivity of these materials, it may be necessary to use insulating layers to isolate PZT 1 from unwanted conducting material. For clarity, these insulating layers are not shown.

Figure 10:
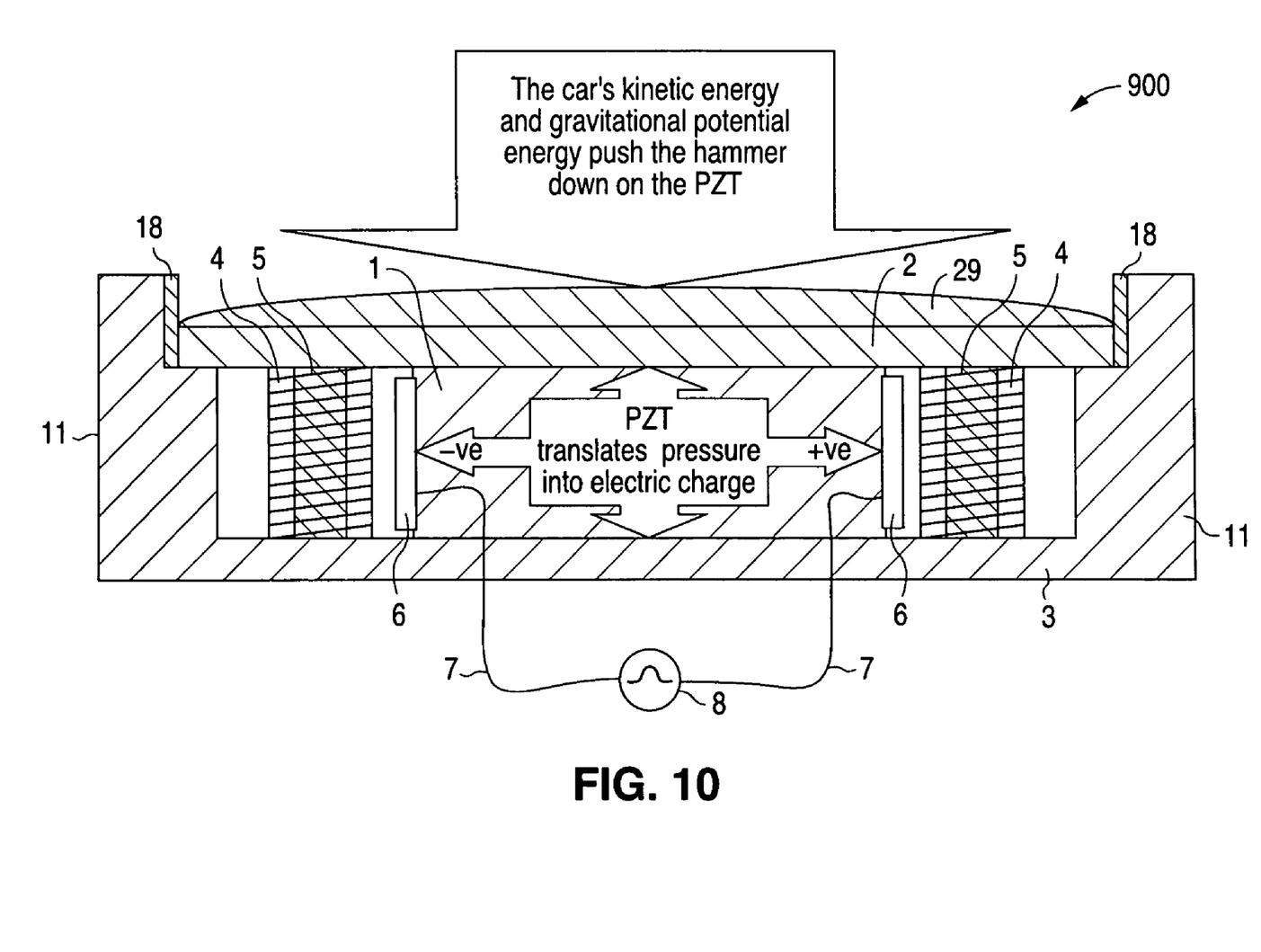

FIG. 9 illustrates PZG cell 900 in the reset and up position. FIG. 10 illustrates PZG cell 900 in the down position when a vehicle is passing over the cell in one embodiment of the invention. The pressure applied to hammer 2 pushes it down on PZT 1 and causes the hammer to sit on top and apply pressure to the PZT. This pressure may even compress PZT 1 by the height of amount of gap 10 (FIG. 9) as hammer 2 eventually rests on step 28 and spring supports 5.

The impact and pressure of hammer 2 on PZT 1 will result in electricity being collected at electrodes 6. For illustrative purposes, voltage meter 8 shows the generation of electrical power. In some cases the output voltage from PZT 1 is very high, up to thousands of volts.

Figure 11:
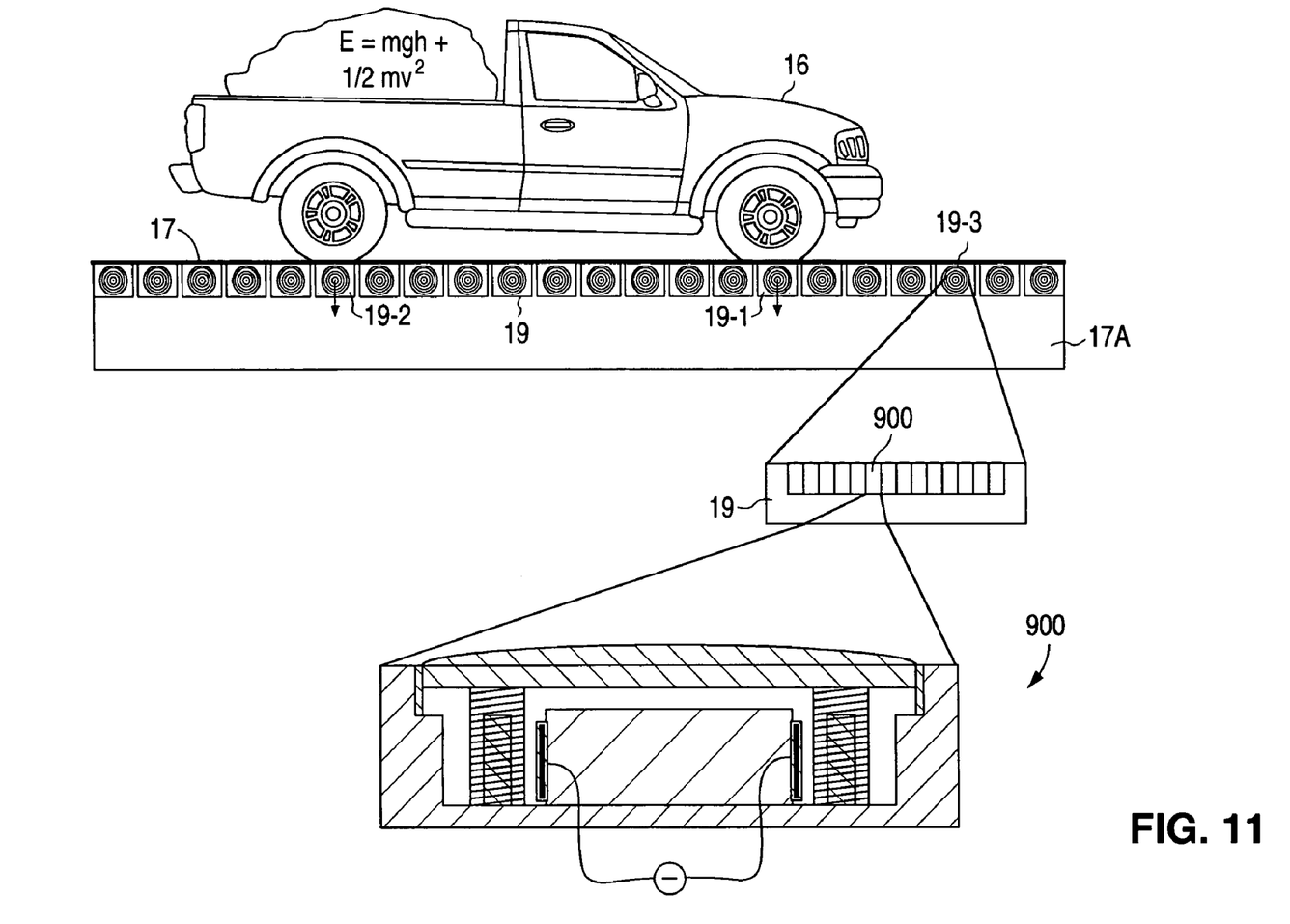
FIGS. 11 and 12 diagrammatically illustrate a vehicle passing over a road surface tiled with electro-gravity plates having piezoelectric gravity cells in the reset and up position and the down position, respectively, in one embodiment of the invention.
Figure 12:
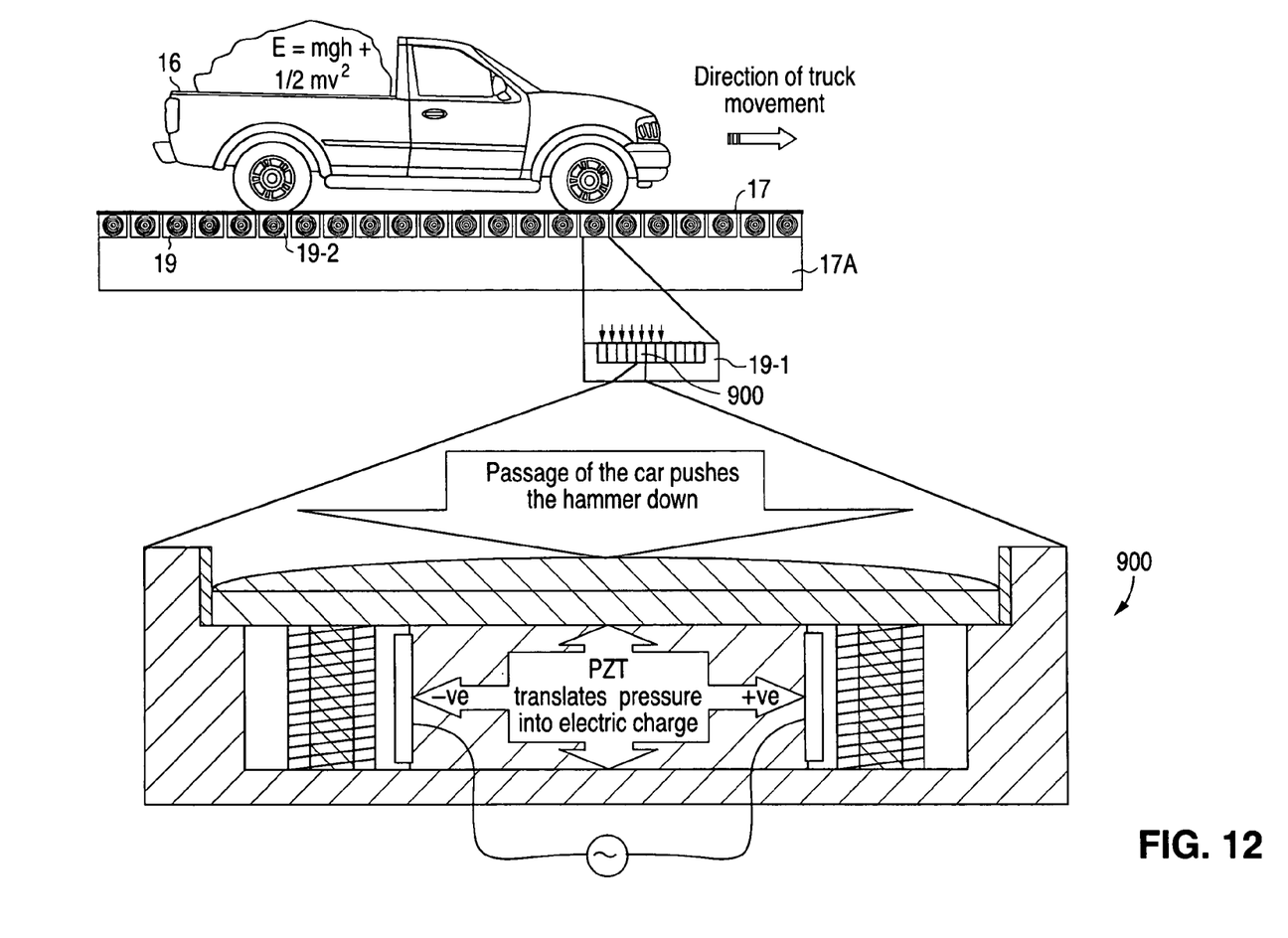

FIGS. 11 and 12 illustrate truck 16 driving over the surface of road 17 that is tiled with EGPs 19 (only one is labeled for clarity). In FIG. 11, EGP 19-3 ahead of truck 16 is chosen to illustrate a plate that is not yet activated. EGP 19-3 is enlarged to show the individual PZG cells 900, which is further enlarged to show the detailed state of one cell. As can be seen, in the absence of the pressure from the tires of truck 16, PZG cell 900 is in the rest and up position.

In FIG. 12, EGP 19-1 under the tire of truck 16 is chosen to illustrate an activated plate. EGP 19-1 is enlarged to show the individual PZG cells 900, which is further enlarged to show the detailed state of one cell. As can be seen, as a result of the pressure from the tires of truck 16, ramp body 2 goes into the down position and compresses PZT 1. In the transition from the up to the down position, PZG cells 900 generate electricity. For simplicity, figures similar to FIGS. 11 and 12 are now shown for VEMG cells 700 of FIG. 7 described above or EMGCD cells 1300 of FIG. 13 described later. In FIGS. 11 and 12, PZG cells 900 can be replaced by VEMG cells 700 of FIG. 7 described above or EMGCD cells 1300 of FIG. 13 described later.

Electromechanical Gravity Cell with Dynamo

Figure 13:
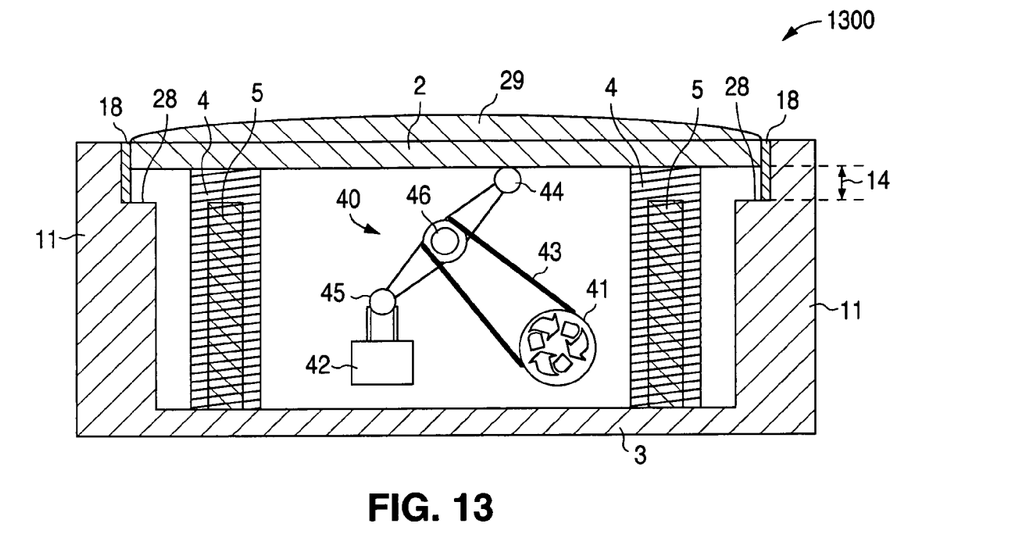
FIGS. 13 and 14 are diagrammatic side views of an electromechanical gravity cell with dynamo in a rest and up position and a down position in one embodiment of the invention.

FIG. 13 illustrates one embodiment of an electro-gravity cell 1300 that replaces solenoid 12 and permanent magnet 13 of VEMG cell 700 with a dynamo (i.e., a generator) in accordance with the invention. Passing vehicle over the cell rotates the dynamo to generate electrical power. This cell is hereafter referred to as an electromechanical gravity cell with dynamo (EMGCD) cell 1300.

In EMGCD cell 1300, ramp body 2 rests on a gravity wheel ("G wheel") 40. G wheel 40 has a drive shaft 46 that is rotatable about a wheel axis. Drive shaft 46 is rotatably coupled by a belt 43 to a generator 41, such as a dynamo.

Two arms extend from drive shaft 46. The right arm has a roller (bearing) assembly 44 that is arranged to be urged against and rotationally slide along the bottom of ramp body 2 in response to G wheel 40 being rotated in a counterclockwise direction as viewed in FIG. 13. Roller assembly 44 may be an actual roller or simply a low friction material on the right ram that allows the right arm to easily and smoothly slide under ramp body 2.

The left arm has a roller (bearing) assembly 45 that is generally diametrically opposed to roller assembly 44. A counterweight 42 hangs from roller assembly 45 to cause G wheel 40 to rotate counterclockwise and urge roller assembly 44 into contact with the bottom of ramp body 2. Along with springs 4, counterweight 42 rotates G wheel 40 to bring ramp body 2 into the reset and up potion in absence of a vehicle passing over EMGCD cell 1300.

Figure 14:
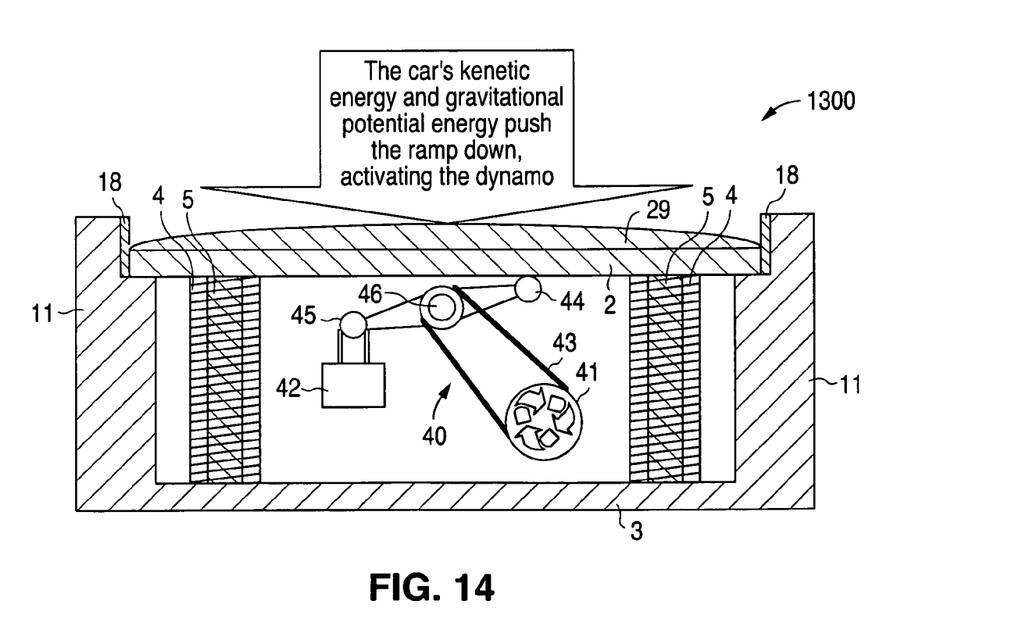

FIG. 13 illustrates EMGCD cell 1300 in the reset and up position. FIG. 14 illustrates EMGCD cell 1300 in the down position. When a vehicle goes over EMGCD cell 1300, the momentum and the mass of the vehicle push down on ramp body 2. Ramp body 2 then pushes down on roller assembly 44, which moves forward and downward. This motion of roller assembly 44 causes G wheel 40 to rotate. This rotation is transferred by belt 43 to generator 41, which then produces electricity.

The connection of G wheel 40 to generator 41 is shown in a simple manner with belt 43. The engagement of G wheel 40 and generator 41 as well as the transfer of rotational motion can be done with a number of combinations of gears and belts. These techniques are not detailed as they are conventional and commercially available. Generator 41 is optionally connected to a flywheel or itself can include a flywheel. Flywheel stores rotational momentum and ensures the rotation of generator 41 after G wheel 40 has stopped rotation.

G wheel 40 is engaged around axis 46 with a ratchet mechanism (not illustrated). The ratchet mechanism ensures that G wheel 40 can rotate clockwise to rotate generator 41 but it is also free to disengage from generator 41 and rotate counterclockwise. This means that generator 41 rotates clockwise with the initial rotation of G wheel 40, and the generator continues to rotate clockwise when the G wheel rotates counterclockwise back to the reset and up position.

Note that as multiple vehicles go over EMGCD cell 1300, the frequent up down movement of ramp body 2 imparts constant motion to generator 41. Since generator 41 could be connected to a flywheel, this constant motion energizes the rotation of the generator to almost a continuous rotation.

As discussed above, impact gap 14 indicates the allowance for the downward movement of ramp body 2 and it is designed to balance between the efficient generation of power and the durability of the cell from repeated use.

Embedded Electronics in the Electro-Gravity Cells

Each type of EGCs 20 described above can have embedded electronics. These embedded electronics that collect, integrate, store, regulate, and transform electric pulses into useful electricity. These embedded electronics are not illustrated as they are conventional and commercially available.

In the drawings for EGCs 20, voltage meter 8 is illustrated to show the generation of the electrical power. In the actual EGCs 20, the wires going to voltage meter 8 are connected to wires from other cells in the same EGP 19. Embedded electronics 22 of EGP 19 and the individual EGCs 20 will produce the integrated and useful electric power output at outlet 23 of the EGP.

Alternative Embodiments

As described in the foregoing, the spring-loaded mechanism for ramp body 2 in the different embodiments of the EGC is not limited to the use of metal coil springs. In one embodiment, springs 4 and spring supports 5 are replaced with rubber blocks or a rubber bushing around the generator. The rubber is elastic so it can be compressed and then return ramp body 2 from the down position back to the reset and up position.

In another embodiment, springs 4 and spring supports 5 are replaced with an encapsulant that hermetically seals the EGC around the generator. Like the rubber bushing, the encapsulant is elastic so it can be compressed and then return ramp body 2 from the down position back to the reset and up position.

In EMGCD cell 1300 described above, the weight of counterweight 42 can be increased to return ramp body 2 to the up position to eliminate the need for springs 4. Counterweight 42 can also be replaced by an elastic member (e.g., a rubber band or a spring) that couples roller 45 of the left arm of G wheel 41 to base 3 of the cell.

In EGP 19, EGCs 20 can be encapsulated by an encapsulant in the EGP. The encapsulant then forms a top cover for EGP 19.

In one embodiment, an EGC 20 can be enlarged and placed on the road to form a speed bump. In this embodiment, the bump on the ramp body of EGC 20 protrudes above the road surface to cause vehicles to slow down as they pass over the EGC.

Various other adaptations and combinations of features of the embodiments disclosed are within the scope of the invention. Numerous embodiments are encompassed by the following claims.

The invention claimed is:

1. A system for generating electricity, comprising a plurality of electro-gravity plates covering a road, each electro-gravity plate comprising an array of electro-gravity cells that individually generates electricity when vehicle pass over and depress the electro-gravity cells wherein each electro-gravity plate comprises; a plate base, a plate body around the plate base; and the array of electro-gravity cells on the plate base and surrounded by the plate body, each electro-gravity cell comprising; a ramp body operable to be vertically displaced from an up position to a down position when a force is applied to a top surface of the ramp body; and an electrical generator that generates electricity from a displacement of the ramp body.

2. The system of claim 1, wherein each electro-gravity cell further comprises:
a cell base;
a cell body around the cell base, the cell body having a rest step that defines a counterbore opening above a main opening to the cell base, the ramp body being seated in the counterbore opening; and
a spring-loaded mechanism that returns the ramp body from the down position to the up position.

3. The system of claim 2, wherein the spring-loaded mechanism comprises:
spring supports mounted to the cell base or the ramp body; and
springs fitted around the spring supports, the spring supporting the ramp body against the cell base.

4. The system of claim 3, wherein the rest step and the spring supports have a same height so the ramp body rests on the rest step and the spring supports when the ramp body is fully seated in the counterbore opening in the down position.

5. The system of claim 2, wherein the spring-loaded mechanism comprises an elastic block or bushing supporting the ramp body against the cell base.

6. The system of claim 2, wherein the spring-loaded mechanism comprises an encapsulant supporting the ramp body against the cell base.

7. The system of claim 2, wherein:
the ramp body comprises a bump having a substantially convex top surface; and
an impact gap is defined from a top surface of the rest step to a bottom surface of the ramp body when the ramp body is at the up position, the impact gap having a same height as the bump so only the bump protrudes above the cell body when the ramp body is at the up position and the ramp body is level with the cell body when the ramp body is at the down position.

8. The system of claim 7, wherein the electrical generator comprises:
a solenoid mounted to one of the cell base and the ramp body; and
a permanent magnet mounted the other of the cell base and the ramp body, the permanent magnet being inserted into wires of the solenoid.

9. The system of claim 7, wherein the electrical generator comprises:
a piezoelectric crystal mounted to the cell base or the ramp body, the piezoelectric crystal being compressed when the ramp body is in the down position; and
electrodes mounted to the piezoelectric crystal to collect electricity.

10. The system of claim 9, wherein a top surface of the piezoelectric crystal is higher than the top surface of the rest step by a distance so the ramp body compresses the piezoelectric crystal by the distance when the ramp body is in the down position.

11. The system of claim 7, wherein each electro-gravity cell further comprises:
a gravity wheel with a drive shaft and an arm extending from the drive shaft against the bottom surface of the ramp body;
wherein:
displacements of the ramp body between the up to the down positions cause the drive shaft to rotate; and
the electrical generator is rotatably coupled to the drive shaft and generates electricity in response to rotations of the drive shaft.

12. The system of claim 11, wherein the electro-gravity cell further comprises a counterweight coupled to another arm extending from the drive shaft, the counterweight maintaining contact of the arm against the bottom surface of the ramp body.

13. The system of claim 12, wherein the electro-gravity cell further comprises an elastic member coupled to another arm extending from the drive shaft, the elastic member maintaining contact of the arm against the bottom surface of the ramp body.

14. The system of claim 2, further comprises a friction-reducing layer on a sidewall of the counterbore opening to allow the ramp body to move smoothly in the counterbore opening.

15. The system of claim 1, further comprising an electronic block coupled to leads from the electro-gravity plates, the electronic block being operable to transform, integrate, and regulate electricity from the electro-gravity plates.

16. The system of claim 1, further comprising an electronic block coupled to leads from electrical generators in the electro-gravity cells, the electronic block being operable to transform, integrate, and regulate electricity from the electro-gravity cells.

17. The system of claim 1, wherein the electro-gravity plates are coupled to a transmission line located adjacent to the road.

18. The system of claim 1, wherein the roadway is on a declining slope.

19. The system of claim 18, further comprising anchors extending from the plate base, the anchors securing the electro-gravity plates to the roadway surface.

20. The system of claim 1, further comprising an encapsulant encapsulating the electro-gravity cells in the plate.

21. The system of claim 20, wherein the encapsulant forms a top cover for the plate.

22. An electro-gravity plate, comprising:
a plate base;
a plate body around the plate base; and
an array of electro-gravity cells on the plate base and surrounded by the plate body, each electro-gravity cell comprising:
a ramp body operable to be vertically displaced from an up position to a down position when a force is applied to a top surface of the ramp body; and
an electrical generator that generates electricity from a displacement of the ramp body wherein each electro-gravity cell further comprises: a cell base; a cell body around the cell base, the cell body having a rest step that defines a counter bore opening above a main opening to the cell base, the ramp body being seated in the counter bore opening; and a spring-loaded mechanism that returns the ramp body from the down position to the up position.

23. The system of claim 22, wherein the spring-loaded mechanism comprises:
spring supports mounted to the cell base or the ramp body; and
springs fitted around the spring supports, the spring supporting the ramp body against the cell base.

24. The system of claim 22, wherein the spring-loaded mechanism comprises an elastic block or bushing supporting the ramp body against the cell base.

25. The system of claim 22, wherein the spring-loaded mechanism comprises an encapsulant supporting the ramp body against the cell base.

26. The system of claim 22, wherein:
the ramp body comprises a bump having a substantially convex top surface; and an impact gap is defined from a top surface of the rest step to a bottom surface of the ramp body when the ramp body is at the up position, the impact gap having a same height as the bump so only the bump protrudes above the cell body when the ramp body is at the up position and the ramp body is level with the cell body when the ramp body is at the down position.

27. The system of claim 26, wherein the electrical generator comprises:
   a solenoid mounted to one of the cell base and the ramp body; and
   a permanent magnet mounted the other of the cell base and the ramp body, the permanent magnet being inserted into wires of the solenoid.

28. The system of claim 26, wherein the electrical generator comprises:
   a piezoelectric crystal mounted to the cell base or the ramp body, the piezoelectric crystal being compressed when the ramp body is in the down position; and
   electrodes mounted to the piezoelectric crystal to collect electricity.

29. The system of claim 26, wherein each electro-gravity cell further comprises:
   a gravity wheel with a drive shaft and an arm extending from the drive shaft against the bottom surface of the ramp body;
   wherein:
      displacements of the ramp body between the up to the down positions cause the drive shaft to rotate; and
      the electrical generator is rotatably coupled to the drive shaft and generates electricity in response to rotations of the drive shaft.

30. The system of claim 29, wherein the electro-gravity cell further comprises a counterweight coupled to another arm extending from the drive shaft, the counterweight maintaining contact of the arm against the bottom surface of the ramp body.

31. The system of claim 22, further comprising an electronic block coupled to leads from electrical generators in the electro-gravity cells, the electronic block being operable to transform, integrate, and regulate electricity from the electro-gravity cells.

32. The system of claim 22, further comprising an encapsulant encapsulating the electro-gravity cells in the plate.

33. The system of claim 32, wherein the encapsulant forms a top cover for the plate.

34. An electro-gravity cell, comprising:
   a ramp body operable to be vertically displaced from an up position to a down position when a force is applied to a top surface of the ramp body;
   a cell base;
   a cell body around the cell base, the cell body having a rest step that defines a counterbore opening above a main opening to the cell base, the ramp body being seated in the counterbore opening;
   a spring-loaded mechanism that returns the ramp body from the down position to the up position; and
   an electrical generator that generates electricity from a displacement of the ramp body wherein the cell is a speed bump on a road so at least a portion of the ramp body protrudes above a top surface of the road.

* * * * *